March 28, 1967          D. W. BECK          3,311,184

EXPLORATORY VEHICLE

Filed Dec. 24, 1963          3 Sheets-Sheet 1

INVENTOR.
DAVID W. BECK

BY John E. Wagner
ATTORNEY

March 28, 1967 D. W. BECK 3,311,184
EXPLORATORY VEHICLE

Filed Dec. 24, 1963 3 Sheets-Sheet 2

INVENTOR.
DAVID W. BECK
BY John E. Wagner
ATTORNEY

March 28, 1967 D. W. BECK 3,311,184
EXPLORATORY VEHICLE
Filed Dec. 24, 1963 3 Sheets-Sheet 3

INVENTOR.
DAVID W. BECK
BY John E. Wagner
ATTORNEY

United States Patent Office 3,311,184
Patented Mar. 28, 1967

3,311,184
EXPLORATORY VEHICLE
David W. Beck, Lakewood, Calif., assignor to Space-General Corporation, El Monte, Calif., a corporation of California
Filed Dec. 24, 1963, Ser. No. 333,131
15 Claims. (Cl. 180—7)

This invention relates to vehicles and more particularly to vehicles designed for locomotion over severe terrain of undetermined or minimal support strength.

There exists a need for a vehicle designed to easily traverse surfaces of unknown composition and severity, such as may be found on the moon or other planets, to allow exploration of the terrain and to sense and relay information regarding the terrain to a parent vehicle and thence to the launch source. A typical requirement for such an exploratory vehicle is that it have the capability of surmounting obstacles equal in height to the dimensions of the vehicle itself and at the same time be capable of traversing surfaces having support strength as slight as that of loosely packed snow. Over and above the need to overcome obstacles is the need for travel reliability up and down inclines in excess of 45°. Other requirements are that the vehicle be able to transport and operate an optical sensor such as a television camera, employing a minimum of mechanization in addition to the normal locomotion apparatus, and to provide complete orientation control of the television camera.

Another objective of such a vehicle is to transport and orient solar cells to provide a source of local power for operation and for charging self-contained storage cells.

A further requirement of such a vehicle is that the motive portions of the vehicle actually assist in the control of the temperature of thermally sensitive electronic and other control portions of the vehicle.

These objectives and requirements are all accomplished in accordance with my teachings, one embodiment of which comprises an articulated structure including a pair of fan-shaped panel members in superimposed oppositely oriented relationship and each connected at a single point to a common central motor containing structure or arm. The panel members, made for example of a resin bonded fiber glass, are relatively light and approximately 80% of the weight of the vehicle resides in the central arm motor carrying portion. The connection between each panel and the central arm is pivoted thereby providing for articulated motion of the vehicle.

The drive system for the vehicle includes a single rotatable cam which cooperates with a pair of rocker arms to alternately extend the panels from the position generally parallel to the length of the central arm member (0°) to a position of 90° with respect to the central arm member and then aligned, or at 180° orientation, with respect to the central arm member. The panel members constitute the tread of the device and by the alternate rotation of the members provides an arrangement whereby the motor arm portion and one panel is periodically lifted with the opposite panel resting on the surface until such time as the center of gravity of the vehicle passes beyond the edge of the support panel and the vehicle topples over to rest upon the second panel. The first panel subsequently is rotated into a position first aligned, i.e. 180°, with respect to the central motor panel and then virtually 0° with respect to the motor arm, with continued rotation of the cam. Through a repeated sequence of such steps the vehicle transports itself by alternately rising and toppling.

One feature of this invention relates to the combination of a central motor carrying portion and a pair of panels driven thereby cooperating to provide a tumbling mode of locomotion of the vehicle.

A second feature of this invention involves the control of the pair of panels individually to provide steering of the vehicle.

A third feature of this invention resides in the drive system whereby a unidirectional rotating motor, a single-load cam, and simple gearing cooperating with the outer panels provides the complete locomotion system.

Another feature of this invention resides in the presence of individual drive motors in combination with each outer panel to provide both steering of the vehicle and orientation of the optical sensor and solar power cells.

One further feature of the invention relates to the motive and orientation cooperation between the panels and the central motor carrying portion of the vehicle whereby the outer panels provide thermal shade and insulation for the motor control and provide a physical cover for these portions and further constitute the antenna carrying and orientation element for communication link from the vehicle.

These and other features of the invention may be more clearly understood from the following detailed description and by reference to the drawing in which.

Figure 1:
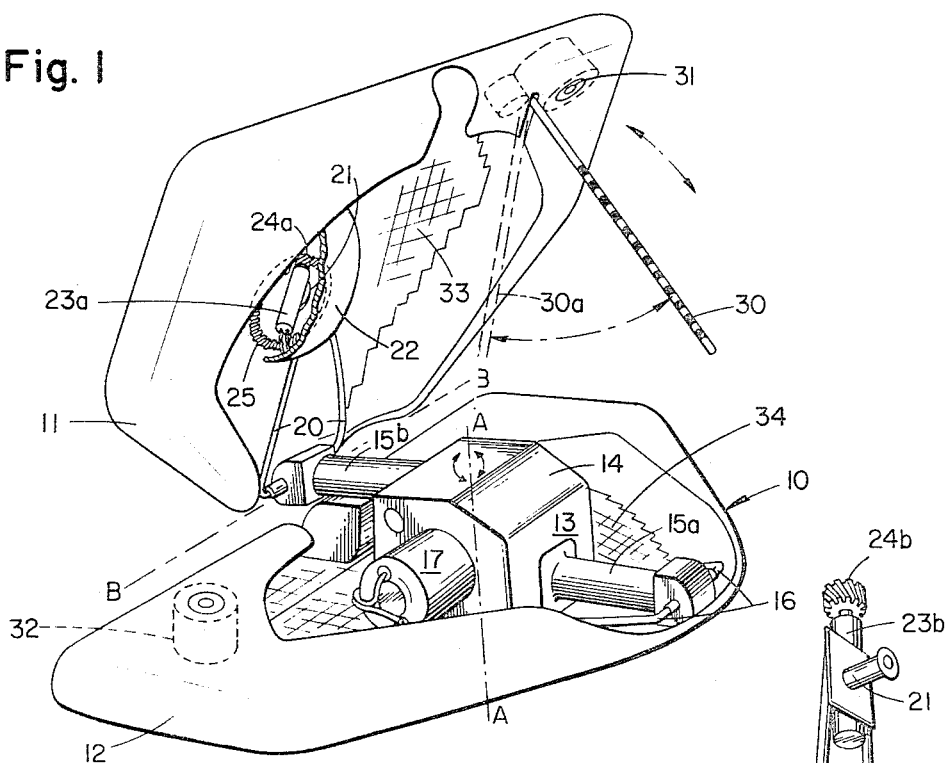
FIG. 1 is a perspective view of the vehicle, in accordance with this invention, partially open and in position for sensing the composition and penetrability of the surface on which it is located.
Figure 4:
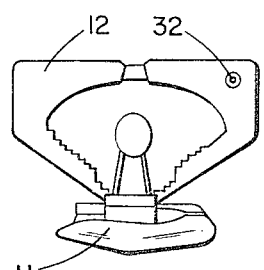
Figure 5A:
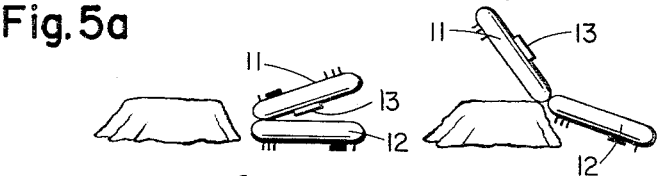
Figures 5B, 5C:
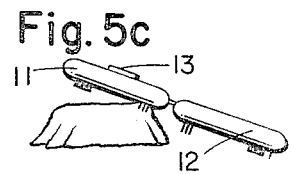
Figure 5D:
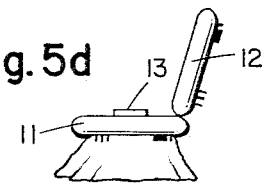
Figure 5E:
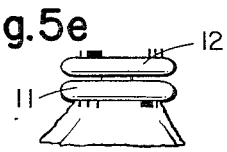
Figure 5F:
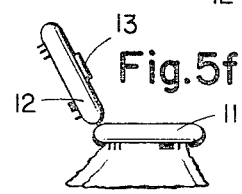
Figure 6A:
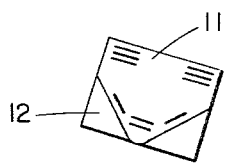
Figure 6B:
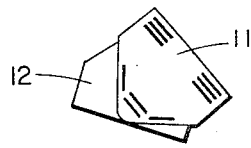
Figure 6C:
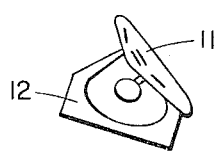
Figure 6D:
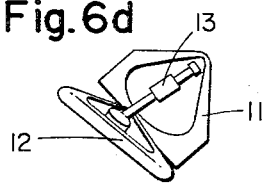
Figure 6E:
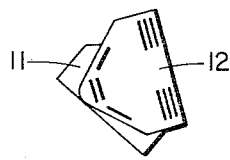
Figure 6F:
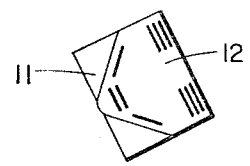
Figure 6G:
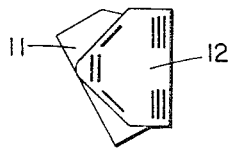
Figure 6H:
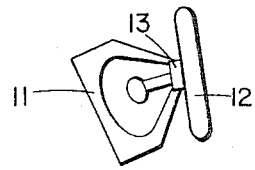
Figure 6I:
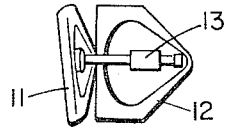
Figure 6J:
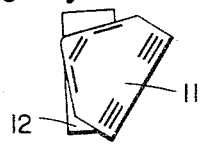
Figure 6K:
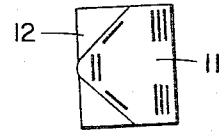
Figure 6L:
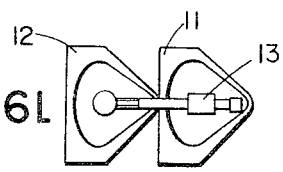

FIG. 3, *a* through *f*, illustrates the vehicle of FIG. 1 in its normal sequence constituting its mode of locomotion;

FIG. 4 is a perspective view of the vehicle of FIG. 1 and its optical sensing orientation;

FIG. 5 illustrates the sequence of steps of the vehicle of FIG. 1 overcoming an obstacle; and FIG. 6 illustrates the vehicle of FIG. 1 negotiating a 90° turn.

Now, referring to FIG. 1, a tumbling exploring vehicle 10 may be seen comprising a pair of identical outer panels 11 and 12, the latter of which temporarily constitutes the supporting surface for the vehicle. Each of the panels, formed of thin light-weight material such as resin reinforced fiber glass, is of a generally fan-shape outline and has curved edge portions which extend inwardly on the inner side to partially enclose the edge portions of the panels while leaving a central region open. In the position shown the central open portion of the panel 12 includes the drive and control arm assembly 13 including a housing 14 and a pair of tubular extensions 15*a* and 15*b* extending out of opposite sides of the housing 14 to a point near the root or pointed end of each of the fan-shaped panels 11 and 12. A pair of drive arms 16 and 20 extend out of the tubular housings 15*a* and 15*b* respectively and constitute the drive connections between the drive assembly 13 and the outer panels 11 and 12. The panels 11 and 12 are each connected to the respective arms 16 and 20 via a central shaft 21, the end of which appears in FIG. 1 under a panel steering drive housing 22. The housing 22 encloses a small drive motor 23*a* with its associated worm gear 24*a* engaging a ring gear 25 affixed to the panel 11. A similar panel orientation drive assembly is associated with the panel 12 but unshown in the drawing since obscured by the drive control housing 14. The motor 23*a* and its counterpart 23*b*, associated with panel 12, is controlled and powered via electrical conductors contained within one of the rods 20 and passing through the tubular housing 15*b* from the control assembly housing 14. The panel orientation drive of panel 11 is illustrated with the panel in its elevated position, however, the motor 23*a* is normally inactive in the locomotion mode of operation and only operative when the panel 11 constitutes the base or support panel. In the position shown panel orientation would be achieved by powering the panel orientation drive motor 23b, associated with the panel 12, which would rotate the entire motor drive arm assembly 13 as indicated by the arrows centered about the vertical dashed axis passed through the center of the housing 13.

In the partially raised position shown, the panel 11 is in position to sense the composition and penetrability of the surface on which the panel 12 is resting. This is accomplished using a penetrometer rod 30 and an optical sensor, television camera 31 carried by panel 11. By pivoting panel 11 about axis BB in the clockwise direction, as indicated by the dashed arrow, the extended penetrometer rod 30 passes the outer edge of the panel 12 and is inserted near vertically into the supporting surface. The penetrometer rod 30 includes a number of horizontal bands monitored optically to determine the depth of penetration of the rod. This depth of penetration correlated with the known force applied through the drive system to the panel 11 plus the area of the tip of rod 30 allows the computation of the surface strength characteristics. As an alternative the penetrometer mounting may include a transducer which monitors probe force. The monitoring of the penetration throughout 30 is accomplished by the television camera 31 located in the panel 11 with its aperture positioned beside the penetrometer drive. The television camera 31, indicated by dashed lines as contained within the overhang portion of panel 11, is preferably of the magnetic deflection vidicon type such as Model 4429 of the Radio Corporation of America designed for use in space applications. A duplicate vidicon 32 is similarly positioned in the panel 12. Both cameras 31 and 32 may be used for terrain observations, depending upon which panel is in the upright position at the time the observation is desired. Actually, the prime function of the cameras is to provide a surface view for steering of the vehicle and for observations to allow mapping of the terrain traversed, but in position adjacent to the penetrometer rod 30 the camera 31 can make the visual observation of the penetration test as well. The penetrometer rod 30 is normally stowed in the position 30a and extended and retracted under the control of a small actuator contained in the housing formed by the overhanging portion of panel 11.

The power for the drive motors of the vehicle is obtained from storage cells, preferably of the alkaline or silver-zinc or silver-cadmium type. A typical battery installation included within the housing 14 is a pair of Model LR3 Silvercel units, manufactured by the Yardney Electronic Corportion of New York, New York, capable of furnishing three ampere hours of energy over 60 to 80 cycles. The storage cells are rechargeable and are supplied by incident radiant energy on two banks of silicon solar cells 33 and 34, mounted on the inner surfaces of the respective panels 11 and 12. A solar panel area of approximately 2.0–2.5 square feet for each of two LR3 battery packs, furnishes a charging current of 0.3 ampere in direct sunlight in the lunar environment sufficient to restore the full charge to the storage cells. Such solar cell capacity can be obtained in a vehicle having panels 11 and 12 of approximately three feet by five feet in size. This requirement determines a practical minimum size for a fully self-powered solar recharged vehicle. The efficiency of the solar cell array, of course, is determined to a major extent upon the direction of orientation of the array, a function of the degree of opening of the two panels 11 and 12 and the orientation of the central motor arm assembly 13, both of which may be controlled by coordinate operation of the panel drive motor 17 and the panel orientation motors 23a and 23b.

In the position shown, the entire weight of the vehicle is supported by the large area outer surface of panel 12. In the case of a vehicle having a total weight of approximately 100 pounds and the dimensions of approximately three feet by five feet for the panels or treads 11 and 12, the loading per unit area is less than 0.06 pound per square inch and is uniformly distributed over the supporting surface. This feature insures mobility of the vehicle on minimum support surfaces. To facilitate travel on such surfaces the under sides of both panels or treads 11 and 12 are fitted with a number of flexible rubber cleats extending largely transverse to the direction of travel. These, hidden in FIG. 1, may be seen in use in FIG. 5.

Figure 2:
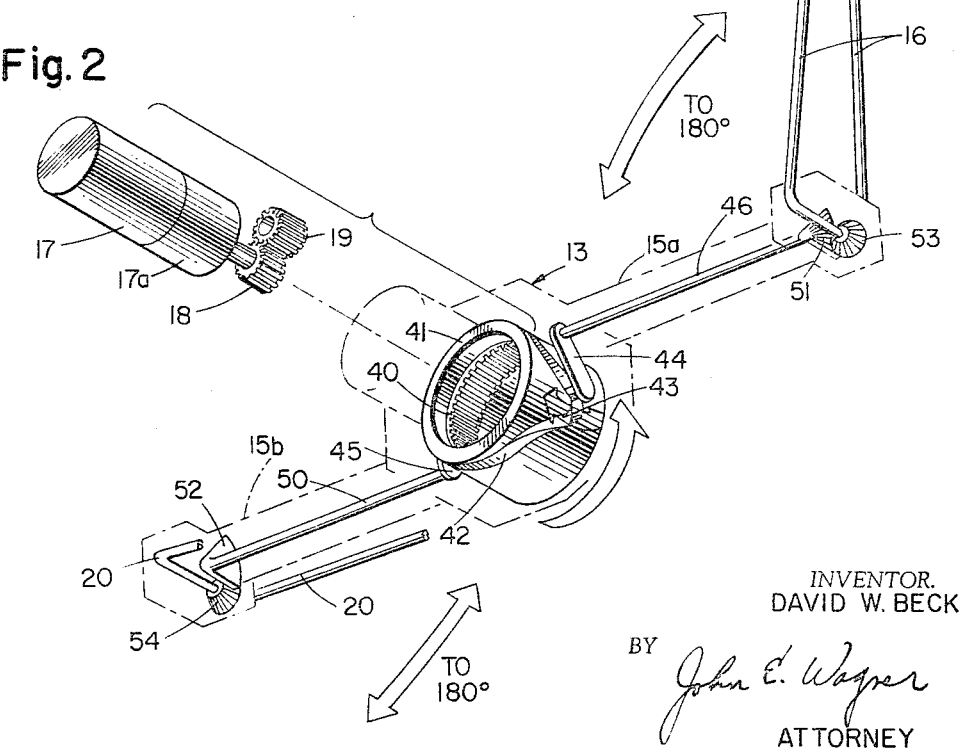
FIG. 2 is a simplified mechanical schematic diagram of the drive portions of the vehicle of FIG. 1.

The operation of the drive system of the vehicle may be more clearly understood by examination of FIG. 2, a simplified mechanical schematic drawing with portions broken away and others exposed for clarity. In FIG. 2 the motor 17, including an integral reduction gear 17a drives an output shaft and spur gear 18. The gear 18 drives a similar gear 19 which engages teeth on the inner surface 40 of a tubular cam member 41. During locomotion the motor 17 operates, continuously driving shaft 18 in a clockwise direction, in turn driving gear 19 counterclockwise and the cam 41 clockwise. The cam 41 constitutes simply a tubular member having a single continuous groove 42 with a single lobe 43. A pair of follower arms 44 and 45, positioned 180° apart with respect to the cam, are driven by pins resting in the groove 42 in a curved path causing follower arms 44 and 45 to deflect 60°. The arms 44 and 45 rotate respective shafts 46 and 50 carrying sector gears 51 and 52. The sector gear 51 engages a gear 53 affixed to arms 16. The gearing 51 and 53 and its counterpart 52 and 54 have a three-to-one gear ratio so that a 60° rotation of either rod 46 or 50 results in an approximately 180° rotation about the axis of gear 53 or 54 of the arms 16 or 20 associated therewith. Therefore, for each revolution of the cam 41, the arms 16 and 20 are each sequentially actuated from the position presently assumed by arm 20 (0°) to a 90° displacement, to a fully extended position of approximately 180° extension, and thence return to the intermediate and final position of 0° displacement. In the position shown, the arm 16 has just passed the 90° displacement and by the time the cam follower 44 reaches the apex of the cam lobe, the arms 16 will be fully extended. It is apparent from FIG. 2 and FIG. 1 that the major mechanical portions of the drive system are centered about the housing 13 and these elements, constituting the major weight of the vehicle, insure that the center of gravity of the vehicle is approximately on the axis of the main drive motor 17. The large mass of the drive system contained in the central drive arm, as compared with the mass of the panel members 11 and 12, is fundamental to the mode of locomotion of the vehicle as may be more clearly understood by examination of the travel of the vehicle through one cycle (two steps) amounting to approximately six feet of advance.

Figure 3A:
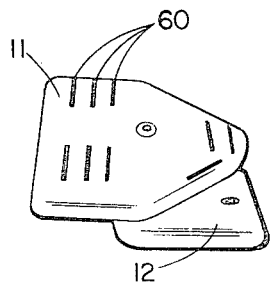

Now, referring to FIG. 3 in connection with FIG. 2, the vehicle is illustrated in FIG. 3a in the position it would normally assume on deposit, without regard to orientation, on a surface. It has two major surfaces, the outer surfaces of panels 11 and 12, and regardless of the position in which it is placed or drops it will tend to rest on one of the outer surfaces. It is apparent that the panels 11 and 12 each include a number of fixed ribs or cleats 60 which serve to improve traction while traveling. Upon receipt of a command signal at the vehicle the drive motor 17, as shown in FIGS. 1 and 2, is energized and drives the cam 43 at approximately seven to eight revolutions per minute. As the cam follower 44, associated with the panel 12, approaches the cam lobe the arm 16 is rotated outwardly thereby elevating both the panel 11 and the arm assembly 13 together, as illustrated in FIG. 3b. These two members together continue to be elevated until the center of gravity of the vehicle reaches a point where the vehicle tumbles toward the left. In FIG. 3c the panel 11 and motor arm assembly 13 are almost fully elevated and as shown in FIG. 3d those two members have tumbled forward and the vehicle has traveled one step (equal to the minor dimension of a panel or approximately three feet) and the panel 12 rests momentarily in a vertical position. Further rotation of the cam 41 continues to extend the arm 16 associated with panel 12 and after tumbling of the vehicle the panel 12 is extended until it reaches the position shown in FIG. 3e. As the cam lobe travels past the follower 44 the panel reverses direction and then closes in a clamshell manner over the panel 11 and motor assembly 13. At the instant the panel 12 closes, shortly after the position illustrated in FIG. 3f, the vehicle assumes the same position as it appeared in FIG. 3a except that the vehicle rests on panel 11 and panel 12 is uppermost. As the motor 17 continues to drive the cam 41 in the same direction, the same sequence repeats. In the example given, with the cam driven at seven to eight revolutions per minute and one cycle or two steps accomplished in each revolution, the vehicle will travel over relatively smooth ground 40 to 50 feet per minute. The speed of locomotion can be increased, of course, by merely changing the gear ratio of the step-down gearing from the motor to the cam. However, for most exploratory purposes the speed of locomotion is of relatively little consequence and the ability to control the direction of movement and to provide suitable conditions for observing and transmitting data are far greater in importance. Likewise, the ability to traverse severe terrain where it cannot be avoided by mere steering is of significance.

Severe terrain mobility and movement is accomplished in the same mode of locomotion as on level terrain, with the vehicle accomplishing the same sequence of operations. This is illustrated in FIG. 5. Because the locomotion cycle includes a step in which the motor arm assembly, constituting the major mass, is elevated there affords an opportunity for the cleats 60 to engage obstacles having a height as high as the minor dimension of a panel. In such case instead of tumbling as in the movement over smooth terrain, the vehicle panel 11 engages the obstacle (FIGS. 5a and b) in an inclined angle and when the vehicle assumes the flat-out position shown in FIG. 5c there is a tendency, due to engagement by the cleats 60 on the under side of the panel 12, to drive the panel 11 and motor arm assembly 13 up onto the crest of the obstacle. As soon as the center of gravity passes the supporting edge of the obstacle it tips generally level and on the subsequent closing of the panel 12 the entire vehicle rests on top of the obstacle. If the obstacle is of such height that it may not be negotiated in this manner, the vehicle will continue to attempt to climb or tumble slightly to one side, and thereby in many cases bypass the obstacle. If overcoming or bypassing the obstacle is not accomplished, the operation of the optical sensor affords an opportunity to view the surrounding terrain and find a more suitable path for the vehicle. Scanning is accomplished, as illustrated in FIG. 4, by elevating either panel to an upright position, e.g. panel 11, and slowly operating panel orientation motor 23b to rotate arm assembly 13 and panel member 11 about axis AA of FIG. 1 in a 360° circle.

To avoid either an obstacle which may not be surmounted or a crevice of greater width than the vehicle, the direction of movement of the vehicle may be changed simply by energizing the panel orientation motor associated with the supporting panel to rotate the second panel and motor arm assembly about the vertical axis so that the vehicle upon tumbling falls slightly to the right or left of its direction of travel. This operation of turning is clearly illustrated in FIG. 6, in this case the panel orientation motor associated with the panel 12 is energized to provide 30° of rotation from the orientation of FIG. 6a to assume the position of FIG. 6b. Upon elevation of panel 11 and motor arm assembly 13 (FIG. 6c) the device tumbles over the angular edge of panel 12 to assume the position of FIG. 6b. The vehicle in this manner takes a 30° step and by realignment of the panels 11 and 12 may proceed, or may as illustrated in FIGS. 6g–6l repeat the sequence.

In the case of the need to avoid an obstacle and retrace steps recently covered, the panel orientation motor is energized to provide 180° of rotation of the arm assembly 13 and panel 11 about the vertical axis and the vehicle tumbles for the first step in the exact opposite direction as in the sequence shown in FIG. 3. Next, a continued rotation of the panel drive motor of panel 12 returns the panel 12 to the normal opposite orientation with respect to panel 11 and the vehicle is in condition to traverse the return path.

This mode of locomotion described for overcoming or bypassing obstacles and reversing direction is also operative to overcome relatively large crevasses which may be encountered by the vehicle. It should be noted in FIG. 3 that in the position shown in FIG. 3e the vehicle assumes a length twice its normal or resting length and thereby extends to a dimension which can allow it to bridge crevasses. It is possible for the vehicle to become entrapped in a crevasse if the panel 11 overhangs the edge by approximately 50% allowing the vehicle, upon closing of panel 12, to tumble into the relatively wide crevasse. It has been demonstrated that even falling into a wide but shallow opening the vehicle can extract itself through its normal mode of locomotion. This normally would involve a number of attempts to climb the sides, occasioned by one or more tumbling sequences backward, but because of the completely symmetrical design a high degree of freedom from becoming immobilized is present. To overcome the residual danger of its becoming entrapped it is the normal practice to command the vehicle to make a number of steps forward and then de-energize the main drive motor at an instant when the vehicle is in the position shown in FIG. 3d. During this stage of locomotion with one panel, namely panel 12 elevated, the optical sensor associated therewith is in position for scanning ahead. Using the television camera preferred, this optical sensor has a field of vision of approximately 50° ahead and 38° in elevation. If it is desired to scan the terrain immediately ahead of the vehicle, an actuation of the drive motor for an instant or two will fold the panel 12 downward slightly until the field of vision covers the terrain ahead sought to be examined. The terrain surrounding the vehicle may be viewed or scanned by operation of the panel orientation motor 23a associated with panel 11. Operation of this motor will rotate the motor arm assembly and panel 12 in a 360° turn about the vertical axis of the vehicle. In FIG. 4 the presentation of the vehicle after 90° orientation is illustrated with the panel 12 and its associated camera 32 facing the observer. The data from the television camera is introduced into a slow scan system with a read-out frame rate of, for example, 3.5 seconds per frame. Such an information rate is adequate for system operation, taking into consideration the vehicle speed and normally expected command steering rate applied to the vehicle. Inasmuch as optical sensing is normally accomplished without the vehicle in motion, there is little need to rapidly sense, transmit, and analyze data and convert it into steering or locomotion command signals. In fact, in normal use the optical sensor may be operated in a stereoscopic mode by intermittently operating the panel orientation drive motor to move the television camera slightly from side to side. Data from the optical sensor is transmitted to a parent vehicle or other receiver by a self-contained radio transmitter having loop antennae imbedded in the panels 11 and 12.

Figure 3B:
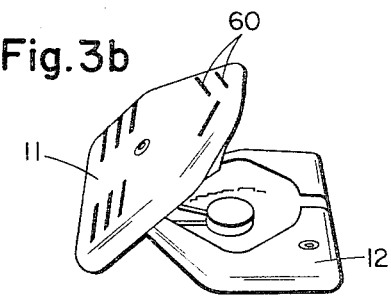
Figure 3C:
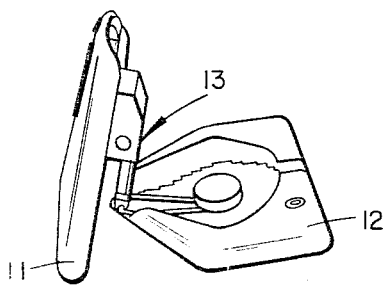
Figure 3D:
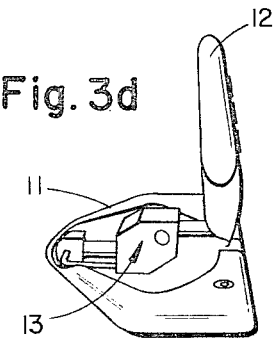
Figure 3E:
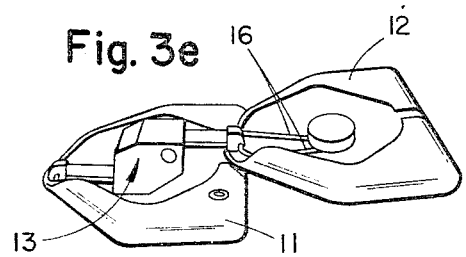
Figure 3F:
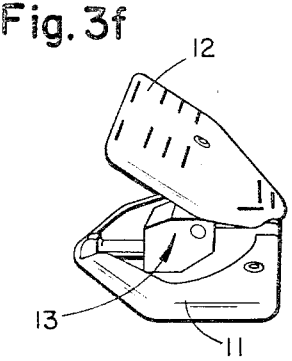

Over and above the operation of the sensors and locomotion, the same drive system used for the above purposes is instrumental in the orientation of the solar cell arrays carried on the inner surface of the panels 11 and 12. In the typical mode of locomotion the vehicle assumes three positions illustrated by FIGS. 3d, e and f with varying degrees of exposure of the solar panels to an energy source in the direction generally ahead of the vehicle. By stopping the drive motor 17 at any position, the amount of incident energy reaching the solar cells may be controlled. In the case of sunrise or sunset conditions the position 3d, with the vehicle oriented towards the rising or setting sun, will provide the maximum presentation of solar cells to the radiant source. In the midday, if maximum energy is desired, the orientation of 3e provides such. If the radiant energy level is higher than optimum it can be reduced by interrupting the drive motor operation at such partially closed positions as illustrated by FIGS. 3b, c and f. This degree of control for optimum incident energy and charging of the storage cells is achieved without any additional apparatus other than the normal drive mechanisms used for locomotion and optical sensor orientation.

As is well recognized, there exists a need for protecting the critical drive and, particularly, electronic components of an exploratory vehicle from the adverse effects of temperature extremes. In the case of a lunar exploratory vehicle, where the lunar day lasting approximately 336 hours exposes the surface of the moon to approximately 250° F. and the lunar night of approximately 336 hours has an average temperature of −250° F., the requirements for the temperature protection of the vehicle are extremely severe. Noting that the vehicle includes a pair of panels which in their normal operation assume varying degrees of shielding for the interior of the vehicle, it is readily apparent that a degree of thermal control can be accomplished merely by changing the orientation of the panels by operation of the drive motor until optimum conditions exist. In the case of full sunlight where there is a danger of damage to the critical electronic control components, the vehicle may be commanded to assume the position shown in FIG. 3a. The exterior of the panels are normally coated with a high reflectivity surface while the interior, including the motor drive arm assembly, is normally highly absorptive; therefore, by selective opening or closing of the panels the correct degree of absorption of energy by the interior of the vehicle may be accomplished. In the case of full sunlight which might be damaging to the apparatus and if there exists no need to travel, the vehicle can be commanded to assume the position shown in 3a. During periods of dawn or dusk where it is desired to maintain the proper temperature of the drive system, batteries, and control equipment contained in the housing 13, the vehicle can be commanded to assume the position shown in 3d, facing the sun. In the case of the lunar night where extremely low temperatures are occasioned, the vehicle is again commanded to assume the position of FIG. 3a, closed, to provide a degree of insulation for the internal apparatus. Supplementary temperature control is accomplished by internal resistant heaters operated by the storage batteries used to maintain the temperature within the housing 13. Apart from this auxiliary heater, again the main drive apparatus of the vehicle constitudes the major thermal control apparatus as well.

It is therefore apparent that the exploratory vehicle described herein, through the cooperative action of a simple unidirectional drive system and a pair of large surface panels, provides a unique mode of vehicle locomotion while asserting an extremely low force per unit area on the supporting panels so that travel over either severe or minimum support terrain can be readily accomplished. It is also apparent that employing this unique mode of locomotion the drive system of the vehicle further provides all of the necessary mechanical movement control and drive to allow the vehicle to transport, orient and utilize solar power sources, optical sensors, and other physical property sensors. Moreover, the cooperation of the drive system with the panels affords a major degree of thermal control in an adverse temperature environment. Despite the numerous functions performed by the apparatus in accordance with this invention, the drive system constituting the heart thereof is of relatively simple and foolproof design.

The embodiments of this invention described above are only illustrative of the principles of this invention and it is fully recognized that one skilled in the art, following my teaching, can devise other variants without departing from the spirit of my invention. The grant hereof therefore is not limited to the embodiments illustrated, but rather by the scope of the following claims and the equivalents thereof.

What is claimed is:

1. A vehicle comprising:
   a central body;
   a motor carried by said body;
   first and second relatively rigid tread members for sequentially supporting said body and other tread member;
   means pivotally connecting said first and second tread members to said body about axes generally coinciding with opposite extremities of said body; and
   means driven by the motor for raising said body and first tread by pivoting said body about the connection with the supporting second tread to a position where the vehicle tumbles onto the first tread thereby advancing the vehicle.

2. The combination in accordance with claim 1 wherein said body raising means is connected to the body and first tread member to raise the body and second tread member by pivoting the body about the connection between the body and said first tread member to a position where said body of the vehicle tumbles onto the tread thereby advancing the vehicle.

3. The combination in accordance with claim 2 wherein said motor is connected to drive both of said body raising means sequentially whereby the vehicle is propelled step-by-step.

4. The combination in accordance with claim 1 wherein said body raising means includes gear means for alternately pivoting said first and second treads approximately 180° from a position in side-by-side relation to an aligned extended position.

5. A steerable articulated treaded vehicle comprising:
   a body;
   motor means carried by said body;
   planar tread means for supporting said body and motor means;
   means pivotally connecting said tread means to said body for sequential positioning to support said body upon the advance thereof;
   said tread means having a pair of angular edge surfaces intersecting at a generally pointed leading edge; and
   means for turning said tread means with respect to said body about an axis normal to the planar support surface of said tread whereby one of said angular edge surfaces becomes the leading edge and the vehicle upon advancing travels in the direction generally perpendicular to such angular edge surface.

6. An exploratory vehicle comprising:
   a pair of broad area supporting tread members;
   a body mounting motor means for the vehicle;
   articulated connecting means between said body and each of said tread members;
   driving means connected to said motor means for alternately positioning said tread means to support the vehicle; and
   a sensor carried into an elevated position by one of said tread means when in a non-vehicle supporting position.

7. The combination in accordance with claim 6 wherein said sensor comprises a television camera rigidly secured to said tread means.

8. The combination in accordance with claim 6 including means for turning the sensor carrying tread means about an axis generally perpendicular to the supporting surface of the vehicle supporting tread whereby the sensor scans the region surrounding the vehicle.

9. The combination in accordance with claim 6 wherein said sensor comprises means selectively movable to an extended position for contacting the supporting surface to sense the physical properties thereof and to a retracted position adjacent to said tread means.

10. The combination in accordance with claim 9 wherein said sensor comprises a penetrometer rod secured to one of said tread means in position to be driven into the vehicle supporting surface by operation of said tread driving means.

11. An exploratory vehicle comprising:
a body;
a motor carried by said body;
a plurality of tread members including an outer vehicle supporting surface;
means for sequentially moving said tread members into a vehicle supporting position;
photoresponsive means for furnishing power for said vehicle;
means mounting said photoresponsive means on at least one of said tread members; and
said tread moving means operative to move said photoresponsive means bearing tread member to orient said photoresponsive means.

12. The combination in accordance with claim 11 including means for turning the photoresponsive means carrying tread member about a generally vertical axis to orient said photoresponsive means.

13. A drive system for a vehicle having at least two treads movable alternately from a vehicle supporting position to a non-supporting position, comprising:

a motor carried by said body;
means mounting the treads for pivotal movement about axes generally transverse to the direction of movement, said axes substantially aligned with opposite extremities of the vehicle; and
individual drive means associated with the treads and driven by said motor for alternately imparting substantially 180° of angular displacement and return to the treads about the respective axes whereby the treads are moved alternately into vehicle supporting and non-supporting positions.

14. The combination in accordance with claim 13 wherein the axes are substantially aligned with the front and rear of the vehicle.

15. The combination in accordance with claim 14 wherein the drive system drives the treads through 180° angular displacement and return by lifting the vehicle while resting on a tread until the vehicle tumbles to rest on such second tread.

References Cited by the Examiner
UNITED STATES PATENTS 2,290,118   7/1942   Page _____ 180—8

OTHER REFERENCES

Bekker, M. G.: "Mechanics of Locomotion and Lunar Surface Vehicle Concepts," January 14, 1963 (SAE paper presented at the SAE Congress January 14–18, 1963 at Detroit, Michigan). SAE No. 632 K (20 pages, including title pages), only pages 1–14 need be obtained.

LEO FRIAGLIA, *Primary Examiner.*